C. STASTKA.
MANGLE.
APPLICATION FILED FEB. 13, 1908.

919,972.

Patented Apr. 27, 1909.
6 SHEETS—SHEET 1.

Witnesses
A. H. Rabsag,
Rex Butler

Inventor
Chas. Stastka,
By H. C. Evertt
Attorneys

C. STASTKA.
MANGLE.
APPLICATION FILED FEB. 13, 1908.

919,972.

Patented Apr. 27, 1909.
6 SHEETS—SHEET 2.

Witnesses
A. H. Rabsag,
N. H. Butler

Inventor
Chas. Stastka,
By H. C. Evertt
Attorneys

C. STASTKA.
MANGLE.
APPLICATION FILED FEB. 13, 1908.

919,972.

Patented Apr. 27, 1909.
6 SHEETS—SHEET 3.

Witnesses
A. H. Rabsag
R. H. Butler

Inventor
Chas. Stastka

By H. C. Evert
Attorneys

THE NORRIS PETERS CO., WASHINGTON, D. C.

C. STASTKA.
MANGLE.
APPLICATION FILED FEB. 13, 1908.

919,972.

Patented Apr. 27, 1909.
6 SHEETS—SHEET 5.

Witnesses
A. H. Rabsag
R. H. Butler

Inventor
Chas Stastka

By H. C. Everett
Attorneys

C. STASTKA.
MANGLE.
APPLICATION FILED FEB. 13, 1908.

919,972.

Patented Apr. 27, 1909.
6 SHEETS—SHEET 6.

UNITED STATES PATENT OFFICE.

CHARLES STASTKA, OF PITTSBURG, PENNSYLVANIA.

MANGLE.

No. 919,972.  Specification of Letters Patent.  Patented April 27, 1909.

Application filed February 13, 1908. Serial No. 415,639.

*To all whom it may concern:*

Be it known that I, CHARLES STASTKA, a subject of the Emperor of Austria-Hungary, residing at North Side Pittsburg, in the county of Allegheny and State of Pennsylvania, have invented certain new and useful Improvements in Mangles, of which the following is a specification, reference being had therein to the accompanying drawing.

This invention relates to mangles, and the object of this invention is, to provide a mangle having a reciprocatory smoothing and stretching surface, by which clothes are treated preparatory to being ironed.

Another object of this invention is to provide a mangle wherein positive and reliable means are employed for imparting a reciprocatory movement to the smoothing and stretching surface.

A further object of this invention is to provide a mangle wherein the smoothing and stretching device can be easily tilted, to allow a fresh supply of clothes being placed in the machine. To this end, I have devised a mangle, wherein a reciprocatory smoothing or stretching device is used in conjunction with rolls for smoothing clothes and fabrics wrapped upon the rolls.

The detail construction entering into my invention will be presently described in detail, and then specifically pointed out in the appended claims.

Figure 1:
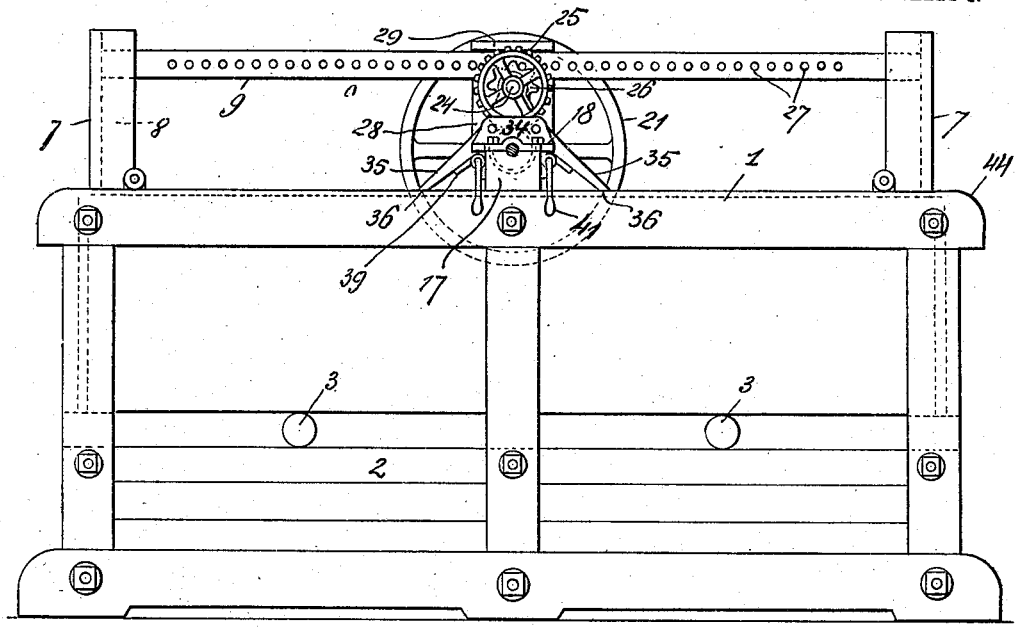
Figure 2:
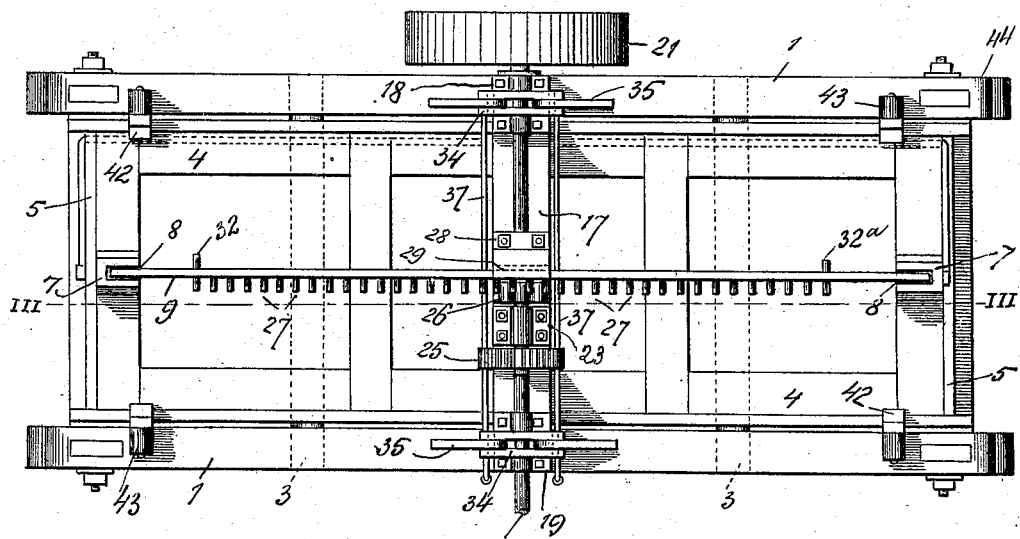
Figure 3:
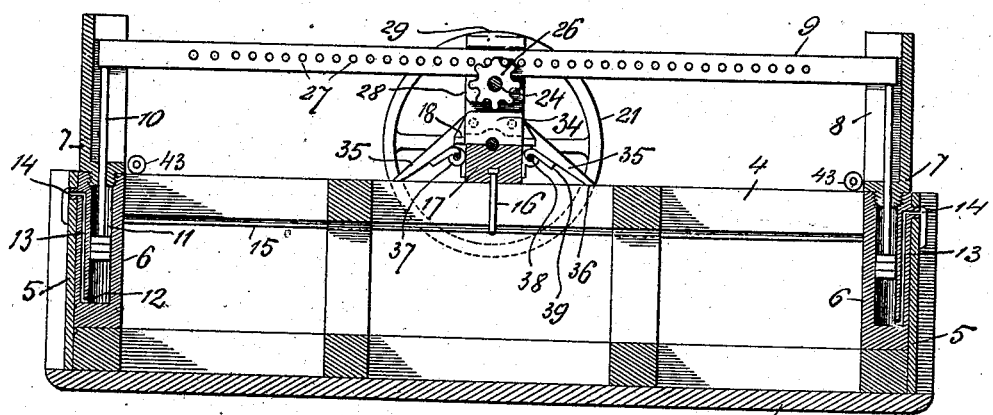
Figure 4:
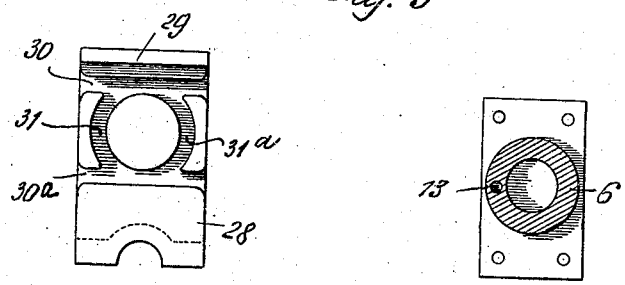
Figure 5:
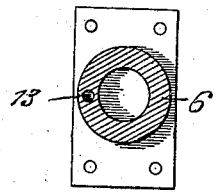
Figure 6:
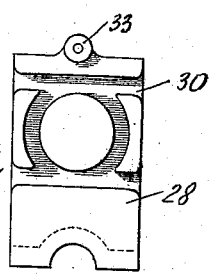
Figure 7:
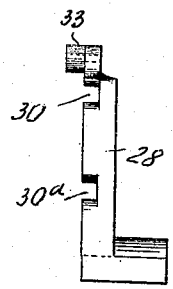
Figure 8:
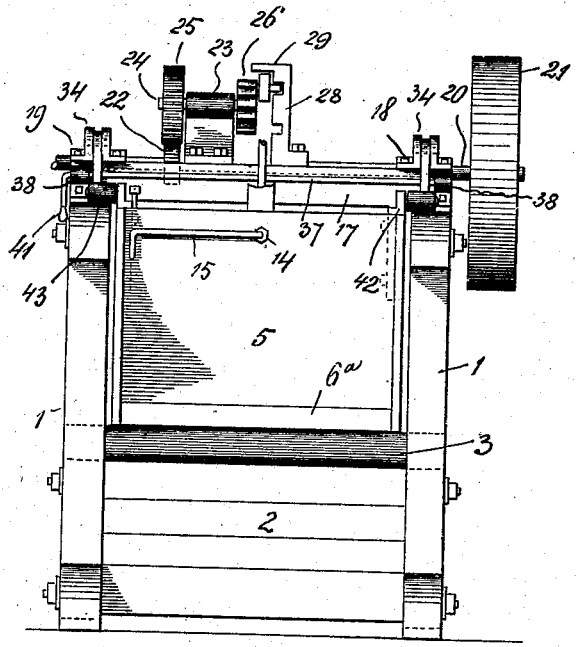
Figure 9:
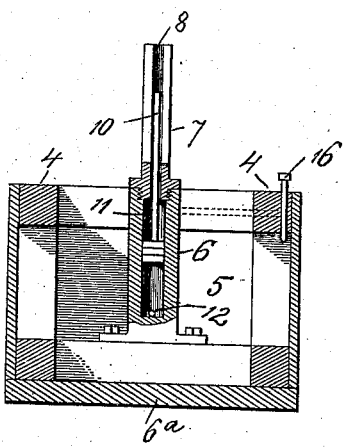
Figure 10:
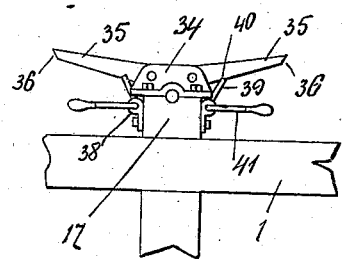
Figure 11:
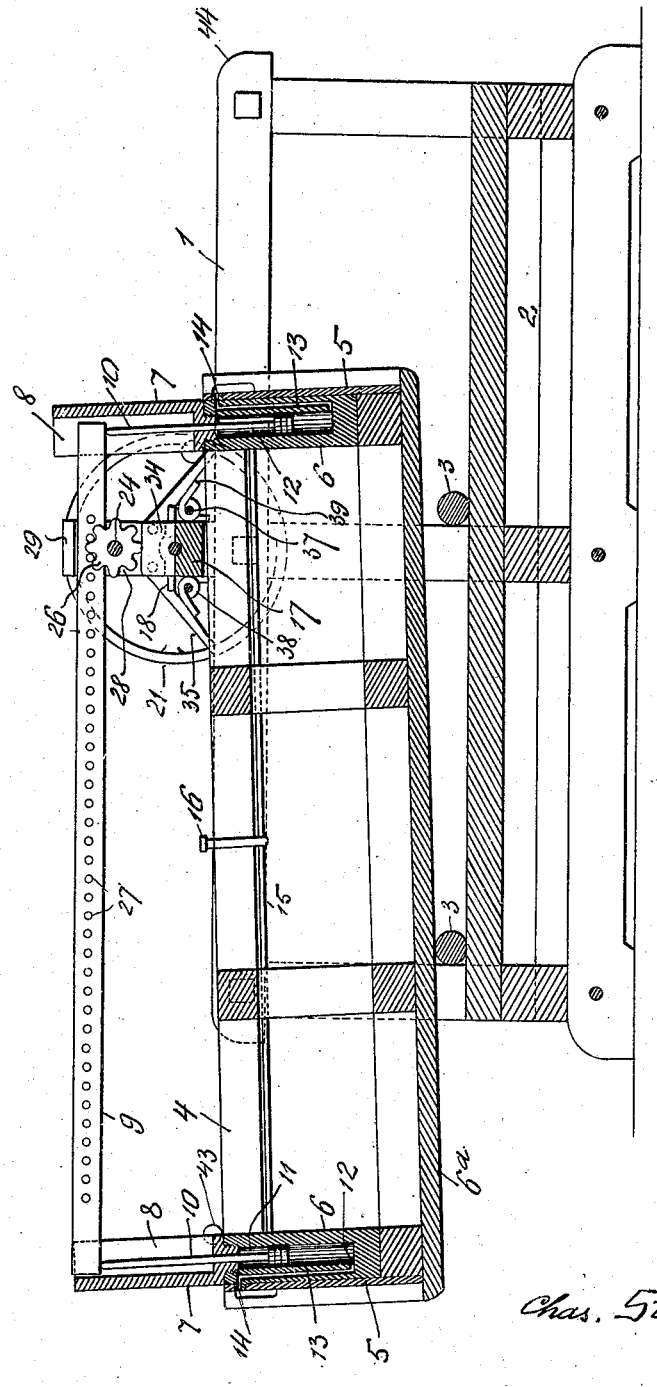
Figure 12:
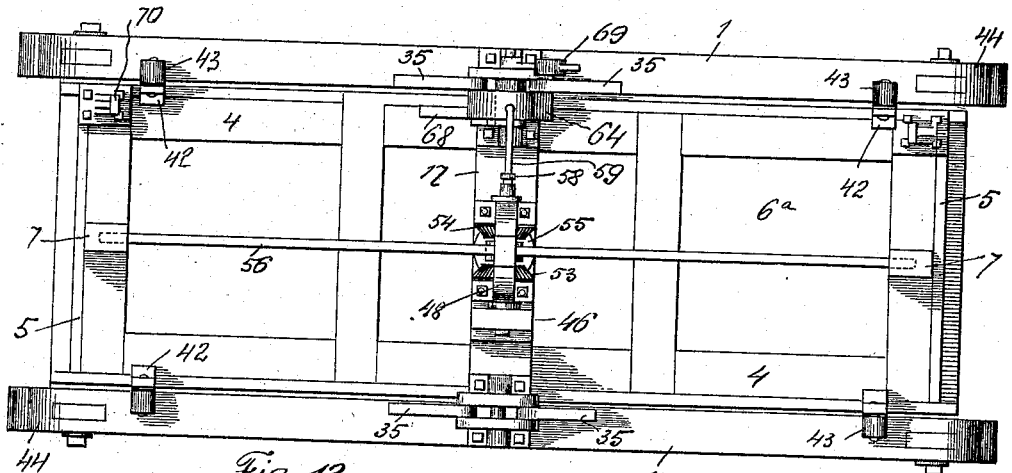
Figure 13:
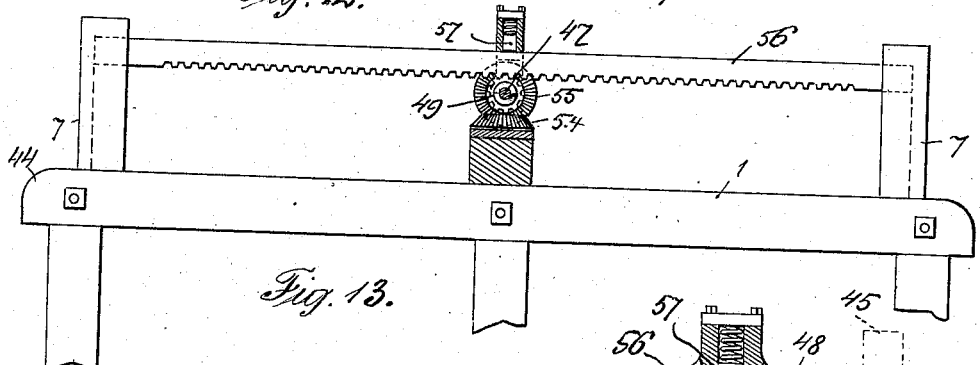
Figures 14, 15:
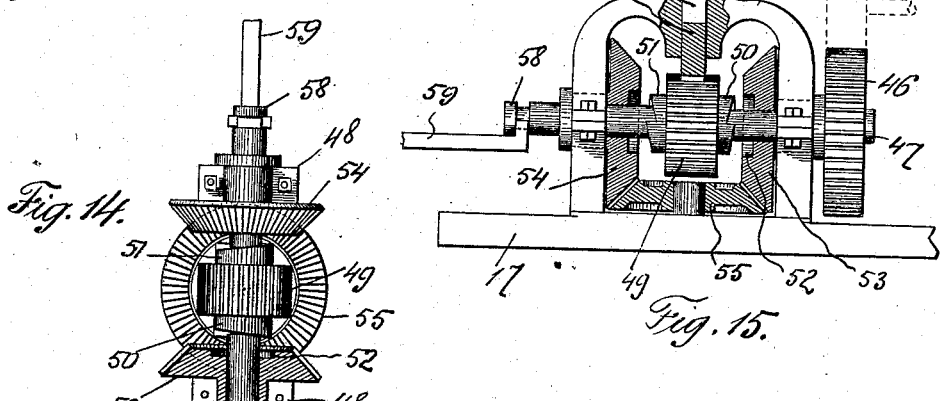
Figure 16:
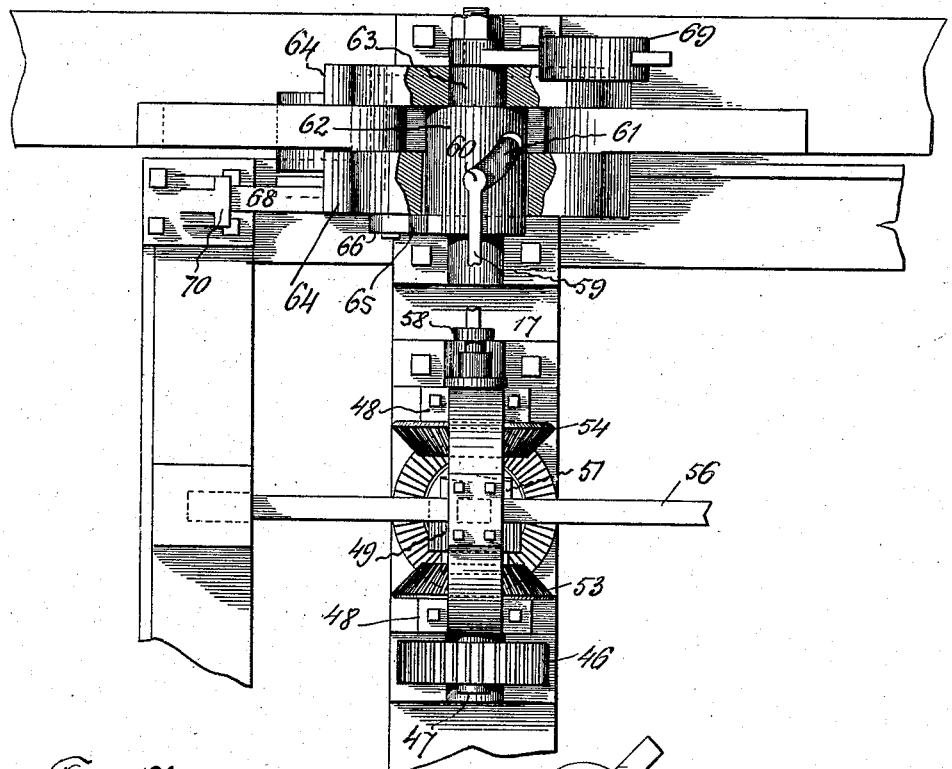
Figure 17:
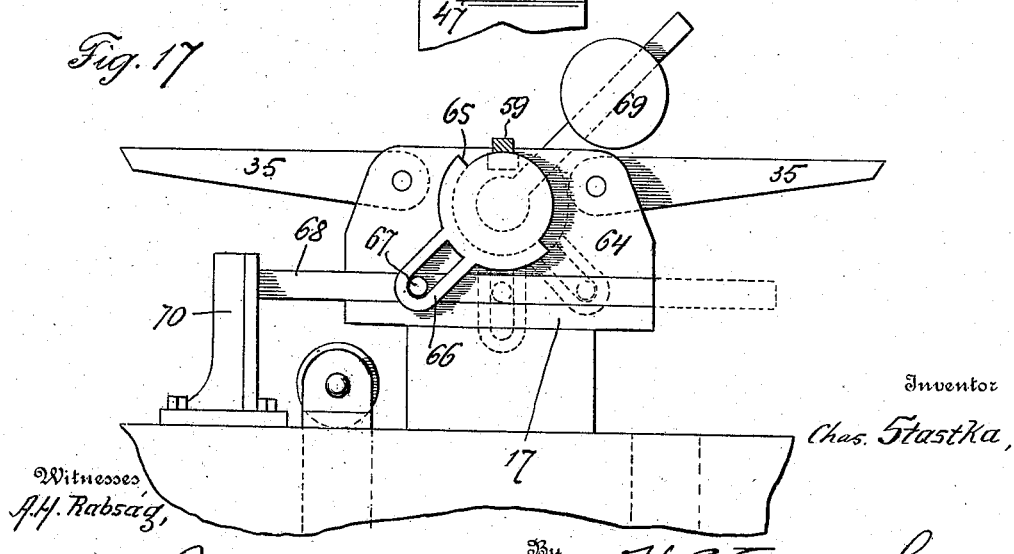

In the drawings:—Figure 1 is an elevation of the machine constructed in accordance with my invention, Fig. 2 is a plan of the same, Fig. 3 is a longitudinal sectional view taken on the line III—III of Fig. 2, a portion of the machine being broken away, Fig. 4 is an elevation of the reversing device, Fig. 5 is a horizontal sectional view of a cylinder or dash-pot used in connection with my machine, Fig. 6 is a front elevation of a modified form of reversing device, Fig. 7 is a side elevation of the same, Fig. 8 is an end view of my mangle, Fig. 9 is a cross sectional view of the reciprocatory device, Fig. 10 is an elevation of a double incline used in connection with the machine, Fig. 11 is a longitudinal sectional view showing the reciprocating device tilted, Fig. 12 is a plan of a modified form of mangle, Fig. 13 is an elevation of a portion of the same, partly in section, Fig. 14 is a plan of the reversing gears used in connection with the reversing device of the modified form of mangle, Fig. 15 is a front elevation of the same, partly in section, Fig. 16 is an enlarged plan of the reversing device, Fig. 17 is an elevation of a portion of the same.

To put my invention into practice, I construct the mangle or laundry machine of a bed comprising substantial side frames, and between these side frames I arrange a foundation or platform 2 upon which rolls are adapted to move. The clothes or fabric to be smoothed and treated by the mangle are wrapped around these rolls, and when pressure is brought to bear upon the rolls and they are moved back and forth upon the foundation or platform 2, the clothes will be smoothed and pressed, whereby the operation of ironing the same will be considerably facilitated. Between the frames, I arrange a reciprocating device adapted to bear directly upon the rolls 3 and exert sufficient pressure upon said rolls to smooth the clothes wrapped thereon. This reciprocating device comprises an oblong box-like structure having side frames 4, end plates 5 and a bottom plate $6^a$. The structure is filled with a suitable material (not shown) that will add weight to the same, whereby when the device is reciprocated, sufficient pressure will be exerted upon the rolls 3.

In each end of the box-like structure I locate a cylinder or dash-pot 6, each cylinder or dash-pot having a threaded cap 7 formed with an upwardly extending bar serving functionally as a guide, with a guide groove 8 for the end of a pin rack 9, arranged longitudinally of the machine. The ends of the pin rack 9 are supported by piston rods 10 having piston heads 11 within the cylinders or dash pot 6. The bottom of each cylinder or dash-pot is provided with an inlet port 12 communicating with a passage 13, which terminates in a nipple 14, extending through the end plate 5 of the box like structure. The nipples 14 are connected by pipes 15 that extend through the end boards 5 and connect with a common pipe 16, this pipe in turn being connected to a suitable supply of air under pressure.

The frames 1 intermediate their ends are provided with a transverse beam 17 and upon this beam is fixed bearings 18 and 19 for a shaft 20, said shaft being driven by hand, steam or a water motor. This shaft is provided with a balance wheel 21 and with a gear wheel 22, the beam 17 being cut away sufficiently to clear the gear wheel 22. Upon the beam 17 is mounted a bearing 23 for a shaft 24, said shaft having a large gear wheel 25 adapted to mesh with the gear wheel 22. The shaft 24 is also provided with a star wheel 26 adapted to mesh with the pins 27 upon one side of the pin rack 9.

Fixed to the beam 17 is a reversing device 28, this device overhanging the pin rack 19, as at 29 and assisting in maintaining said pin rack in a horizontal position irrespective of the tilting movement or angularity of the reciprocating device. The reversing device 28 is formed with two parallel horizontal grooves 30 and 30$^a$, and with two oppositely disposed segment-shaped grooves 31 and 31$^a$, these grooves being described with radii having a common center.

The pin rack 9 is provided with two pins 32 and 32$^a$, these pins being arranged contiguous to the ends of the pin rack 9 and upon the opposite side thereof from the pins 27. The pins 32 and 32$^a$ are adapted to travel in the grooves 30 and 30$^a$ and 31 and 31$^a$ as will be presently described.

A modification of the reversing device is illustrated in Figs. 6 and 7 of the drawings, wherein the overhanging portion of the device comprises a revoluble roller 33 which decreases friction between the pin rack and the reversing device.

The bearings 18 and 19 are formed with parallel flanges 34 and pivotally mounted between said flanges are bars 35 having beveled ends 36 for engaging the frames 1. The bars serve functionally as incline tracks and are maintained in an elevated position by shafts 37, journaled in bearings 38 carried by the beam 17. The shafts 37 have protuberances 39 for engaging in notches 40 formed in the bars 35. Each shaft is provided with an operating lever 41.

The box like structure of the reciprocating device is provided with brackets 42 for rollers 43, these rollers being located upon the sides of the box-like structure at the ends thereof, and bearing upon the frames 1.

The operation of my device as just described, is as follows:—Assuming that a rotary movement is imparted to the shaft 20, this shaft through the medium of gear wheels 22 and 24 will impart a similar movement to the star wheel 26, and as said star wheel meshes with the pins 27 of the rack 9, this rack will be reciprocated carrying with it the cap 7, the cylinders or dash-pot 6, and box like structure of the reciprocating device. Assuming that the end of the rack carrying the pin 32 is reached, this pin will enter the groove 30 of the reversing device 28. As the star wheel 26 passes out of engagement with the last pin 27 of the rack 9, said star wheel has a tendency to force the end of the rack downwardly, causing the pin 32 to move around in the segment-shaped groove 31$^a$ and pass out of the groove 30$^a$. This movement of the rack places the pins 27 thereof in engagement with the underside of the star wheel 26, and causes a reverse movement of the rack 9, cap 7, cylinders or dash pots 6 and the box-like structure of the reciprocating device. During this movement of the pin and rack 9, the same is maintained in a horizontal position by the pressure of air within the cylinders or dash pots 6, but the box-like structure and the cylinders or dash pots can tilt, whenever it is desired to place a new roll of clothes under the reciprocating device. This is accomplished by throwing down either set of the bars 35. As one end of the reciprocating device reaches the bars 35 the rollers 43 at that end of the device will travel upwardly upon the bars, tilting the device and permitting of a roll of clothes being removed and another roll placed under the device. Both sets of bars 35 can be lowered, when it is desired to tilt the device at the end of each stroke.

It is evident that when the reciprocating device is tilted, one set of rollers 43 will travel off of the frames 1, but owing to the beveled ends 44 of said frames, these rollers will readily travel upwardly upon the same when the device assumes a horizontal position.

It is thought that the operation of reversing the pin rack 9 by virtue of the pin 32$^a$ and grooved reversing device 28 will be fully understood from the above description.

It will be observed that while the pin rack 9 maintains a horizontal position during the tilting movement of the reciprocating device, it is impossible for the ends of the pin rack 9 to become disengaged from the caps or guides 7, and in this manner the piston rods 10 maintain the pin rack 9 in a horizontal position.

In Figs. 12 to 17 inclusive of the drawings, I have illustrated a slight modification of my invention, wherein a novel reversing device is used in lieu of the reversing device 28 and the pins 32 and 32$^a$. This reversing device is adapted to be driven by an electric motor (not shown) through the medium of a gear wheel 45 shown in dotted lines in Fig. 15 of the drawings. This gear wheel is adapted to at all times mesh with a gear wheel 46, fixed upon the end of a shaft 47, slidably mounted in a yoke 48, carried by the beam 17. Upon the shaft 47 is mounted a pinion 49 having two integral clutch members 50 and 51, these clutch members being adapted to alternately engage in the recesses 52 of bevel gear wheels 53 and 54, said gear wheels meshing with a bevel gear wheel 55 revolubly mounted upon the beam 17. Meshing with the pinion 49 is an ordinary toothed rack 56, this rack being held in engagement with the pinion 49 by a spring pressed block 57 mounted in the yoke 48. The toothed rack corresponds to the pin rack 9 previously described and is supported at its ends in the same manner as the pin rack 9. The opposite end of the shaft 47 is provided with a circumferentially arranged groove 58 and engaging in said groove is the end of a bar 59. The opposite end of the bar 59 is provided with a head 60 engaging in a cam groove 61, this cam groove being formed in a collar 62, carried by a shaft 63 journaled in bearings 64. The collar 62 is formed with shoulders 65 adapted to engage the rod 59 for limiting the movement of the collar 62 in either direction and the collar 62 is furthermore provided with a radially disposed yoke 66. In this yoke extends a pin 67, carried by a bar 68, slidably mounted in the innermost bearing 64. The shaft 63 is provided with a weighted crank arm 69. The ends of the reciprocating device, upon that side near the bearings 64 are provided with uprights 70, adapted to be impinged by the bar 68, move said bar, rotate the shaft 63 and the collar 62, and move the bar 59 to reverse the direction of movement of the reciprocating device. This is accomplished by either one of the clutch members 50 or 51 engaging either one of the bevel gear wheels 53 or 54.

My invention is susceptible to such changes as are permissible by the appended claims.

Having now described my invention what I claim as new, is:—

1. In a mangle, the combination with a bed, of a plurality of rolls mounted upon said bed, a reciprocating device mounted upon said rolls, a dash-pot arranged at each end of said device, pistons arranged in said dash-pots, a rack supported by said pistons and arranged longitudinally of said device, bearings supported by said bed, a revoluble shaft arranged in said bearings, means actuated by said shaft for reciprocating said device through the medium of said rack, means arranged near said bearings for tilting said device, and means carried by said bed and engaging said rack for reversing said device.

2. In a mangle, the combination with a bed having side frames, and rolls movably mounted upon said bed, of a reciprocating device mounted upon said rolls and having dash pots at the ends thereof, each of said dash pots provided with a piston, a rack supported by said pistons, a revoluble shaft journaled transversely of said bed, means carried by said shaft for imparting a reciprocatory movement to said device through the medium of said rack, means arranged upon the frames of said bed for tilting said device, and means supported by the frames of said bed for reversing the movement of said device.

3. In a mangle, the combination with a bed, and rolls mounted thereon, of a reciprocating device mounted upon said rolls, and having dash pots at the ends thereof, each of said dash pots provided with a piston, a rack carried by said pistons, means arranged transversely of said frame for imparting a reciprocatory movement to said device through the medium of said rack, means supported by said bed for tilting said device, and means for reversing the movement of said device.

4. In a mangle, the combination of a bed, a reciprocatory device arranged on said bed, and having a fluid pressure operated support at each end, rolls interposed between said bed and said device, means arranged transversely of said bed for reciprocating said device, said means including a rack mounted upon said supports, a revoluble shaft, and a pinion, and means supported by said bed for tilting said device.

5. In a mangle, the combination with a bed and rolls movably mounted upon said bed, of a reciprocatory device mounted upon said rolls having a fluid pressure operated support at each end, a rack mounted upon said supports, a revoluble shaft journaled transversely of said bed, means carried by said shaft for imparting a reciprocatory movement to said device through the medium of said rack, and means supported by the bed for reversing the movement of said device through the medium of said rack.

In testimony whereof I affix my signature in the presence of two witnesses.

CHARLES STASTKA.

Witnesses:
A. H. RABSÁG,
MAX H. SROLOVITZ.